J. C. THEBERATH.
AUXILIARY SUPPORTING AND POSITIONING MEANS FOR AUTOMOBILE ENGINES.
APPLICATION FILED JULY 24, 1919.
1,437,621.
Patented Dec. 5, 1922.
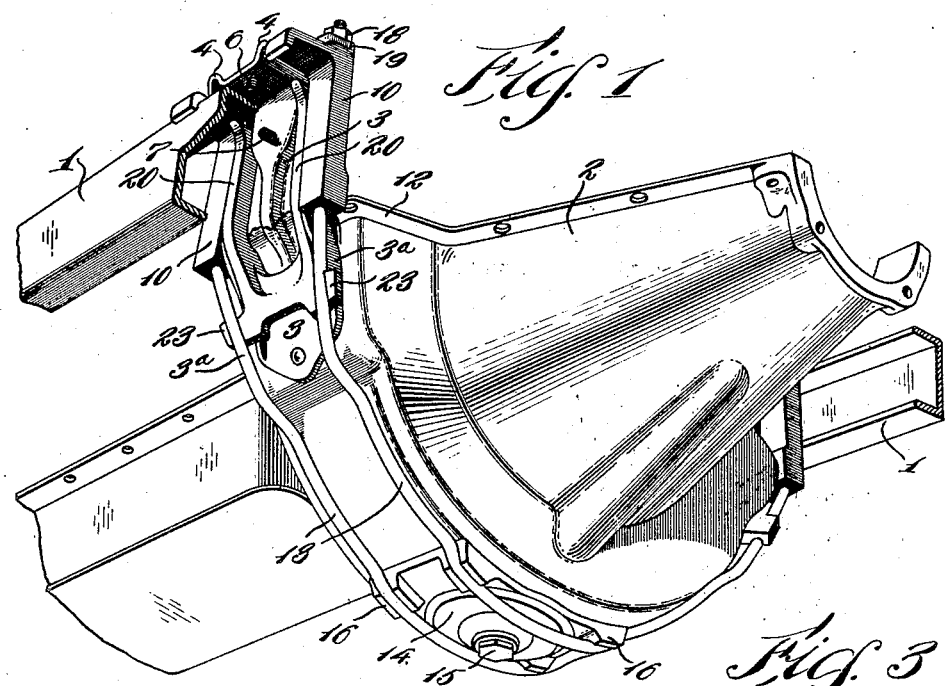

Patented Dec. 5, 1922.

1,437,621

UNITED STATES PATENT OFFICE.

JOSEPH C. THEBERATH, OF LAKEWOOD, OHIO, ASSIGNOR TO RALPH A. ROHRICH, OF CLEVELAND, OHIO.

AUXILIARY SUPPORTING AND POSITIONING MEANS FOR AUTOMOBILE ENGINES.

Application filed July 24, 1919. Serial No. 313,067.

*To all whom it may concern:*

Be it known that I, JOSEPH C. THEBERATH, a citizen of the United States, residing at Lakewood, in the county of Cuyahoga and State of Ohio, have invented a certain new and useful Improvement in Auxiliary Supporting and Positioning Means for Automobile Engines, of which the following is a full, clear, and exact description, reference being had to the accompanying drawings.

This invention relates to automobile engine supporting means and more particularly to a reenforcing and aligning device for weak or broken crank case arms, the same being specially designed for use in conjunction with the auxiliary engine support disclosed in my former application, Serial No. 221,634, filed March 11, 1918. The invention comprehends in fact the combination of my former supporting means and the reenforcing and aligning device herein disclosed.

The purposes of the device are to reenforce and stiffen the crank case arms and properly align the parts thereof in case the arms are broken; to maintain a fixed relation between the crank case and the frame members from which it is suspended; to assist in holding the parts of my auxiliary engine supporting means above referred to in proper position, and together therewith, to impart rigidity and stability to the whole structure, thus prolonging the life of the automobile and obviating considerable annoyance and expense.

The invention, in its present preferred embodiment is illustrated in the drawing accompanying and forming a part hereof and wherein Fig. 1 is an underneath perspective view of an engine crank case suspended from the side rails of an automobile frame or chassis and equipped with my improved supporting and reenforcing means; Fig. 2 is a fragmentary rear end elevation of the crank case shown in Fig. 1 with the side member of the frame and the supporting means in section; and Fig. 3 is a perspective view of a fractured crank case arm and the adjacent part of a crank case, and the reenforcing and aligning device removed therefrom.

The side members of an automobile frame are designated 1, and between them is suspended the lower half of a crank case 2, by means of the usual arms 3. It will be observed that each arm 3 is beaded along each side, producing channels 4, and that the upper end of the arm is turned outwardly to bear upon the top of the adjacent frame member 1. Each arm is secured to the respective side member by the bolts 6 and 7 in a usual and well known manner. Attention is called particularly to an aperture 8 that is formed in the lower portion of the arm 3, the same being common in the type of engine wherewith my supporting means is especially designed for use.

My auxiliary supporting means consists of anchorage elements 10 in the form of hooks that are adapted to be engaged over the tops of the frame members 1 on the opposite sides of the arms 3, and the body portions of these anchorage elements are designed to fit snugly between the inner sides of the frame members and the flange 12 of the crank case. The body portions of the elements 10 have longitudinal bores through which are projected upwardly the ends of the suspension rods or elements 13. A saddle 14 is designed for application to the bottom of the crank case and the same is provided with an aperture that fits over the drain boss 15 of the lowest part of the case. The ends of the saddle have bifurcated lugs which embrace the suspension rods or elements 13 so as to hold them against lateral displacement. The upper ends of the suspension elements or rods 13, where they project above the anchorage elements 10, are threaded for the application of nuts 18, and a plate 19, having apertures near its ends, is applied to the rods or suspension elements 13 above each pair of anchorage elements for the purpose of holding the anchorage elements against separation.

Thus it will be seen that the saddle plate 14 is held in place by the boss 15 of the crank case; the rods 13 are held against lateral displacement by the bifurcated lugs 16 of the saddle plate, and the anchorage elements are held against separation by the plates 19.

Although the parts are thus held against actual displacement, the arms 3 and the rods 13 are sufficiently resilient to permit more or less play and vibration between the frame members and the engine crank case, and as a result of this the crank case arms may be injured, and in case they are actually broken at the time the supporting means is applied and drawn up tightly, the severed ends of the arms are liable to be jarred out of alignment and pass each other so as to overlay and thus shorten the arms and destroy the former tension of the supporting means, permitting the engine to vibrate unduly and all parts to shake and rattle.

To obviate such a difficulty, I provide the reenforcing and aligning device 20 which is in the form of a yoke the branches whereof fit the channels 4 of one of the arms 3 and the base part engages between the lower ends of the side flanges 3ª of the arm. A boss 21 projects from the rear of the device 20 and is adapted to fit snugly within the aperture 8 of the crank case arm, while the upper ends of the branches of the device engage beneath the top flange of the adjacent frame member 1. The device is of such size as to reestablish and maintain the original relation between the frame members and the crank case both as to the vertical and lateral position of the case. Consequently the broken or distorted crank case arms are reformed to their original size and condition when the devices are applied to the crank case arms and the suspension rods or elements 13 are drawn up under tension by means of the nuts 18. Hooked extensions 23 of the devices 20 project out over the flanges 3ª of the crank case arms and engage about the suspension rods 13 to hold them against separation or deformation in the region of the anchorage elements.

It will be seen from this description that my invention provides an attachment which may be readily applied to automobile engines with convenience and dispatch and which when applied and adjusted as explained, will serve to retain the parts in a proper fixed relation to one another and hold the crank case against movement in any direction relative to the side members of the frame. From a careful inspection of Fig. 2 it will be seen that the branches of the device 20 fit snugly against the bottom flange of the frame member 1; that the device is backed up by the crank case arm; and that the arm, in turn, is supported by the flange of the engine crank case. It will be observed also that the hooked ends of the anchorage elements 10 tightly embrace the top flange of the frame member. Consequently it is impossible for the frame member to twist either outwardly at the top or inwardly at the bottom as when a twisting strain is imposed upon it by a person stepping upon the running board which is supported from the frame member in a well known manner. Furthermore there is no chance of the frame member bending longitudinally in the region of the supporting arm because its upper flange is restrained from bending upwardly by the anchorage elements and downwardly by the device 20. This prevents the arms 3 from being distorted; the rivets which hold them to the crank case from being sheared; or the rivet holes of the crank case from being enlarged (which, if permitted to occur, results in leakage of oil from the case).

Now besides its utility in conjunction with a suitable supporting means, the reenforcing device 20 is valuable alone as a stiffener for crank case arms. Fitting as it does within the channel of the arm and confined between the arm and the frame member, while its upper end bears against the top flange of the frame member and its boss 21 within the aperture 8 of the arm, the device is held securely in place. In this connection it may be explained that the normal cross dimension between the branches of the device is somewhat greater than the distance between the channels 4 of the arm so that when the device is driven upwardly between the side flanges of the arm it is placed under tension and fits within the arm with a wedging action.

Having thus described my invention, what I claim is:

1. In an auxiliary supporting and positioning contrivance for automobile engines in addition to the standard engine supporting brackets, the combination of means for suspending the engine from the automobile frame, and means interposed between a part of the engine and an underneath portion of the frame and arranged in opposition to the suspension means, one of said means being adjustable.

2. In an auxiliary supporting and positioning contrivance for automobile engines, the combination of means for suspending the engine from the side members of the automobile frame, and reenforcing devices engaging the supporting arms of the engine case to impart rigidity thereto.

3. In an auxiliary supporting and positioning contrivance for automobile engines having channeled supporting arms, the combination of means for suspending the engine from the side members of the automobile frame, and a device fitting within each supporting arm of the engine to impart rigidity thereto.

4. In an auxiliary supporting and positioning contrivance for automobile engines having channeled supporting arms, the combination of means suspending the engine from the side members of the automobile frame, and a device designed to fit within the channeled supporting arms of the engine, the latter having abutments between which and portions of the frame members the aforesaid devices are designed to fit.

5. In an auxiliary supporting and positioning contrivance for automobile engines, the combination of means for suspending the engine from the side members of the automobile frame, the engine casing having apertures, and devices bearing against portions of the frame members and having projections engaging within the apertures of the engine case.

6. In an auxiliary supporting and positioning contrivance for automobile engines, having channeled supporting arms, the combination of means for suspending the engine from the automobile frame, and a device designed to fit within each of the channeled supporting arms of the engine, the latter having an aperture and the device a projection engaging within said aperture, the device bearing upwardly against the adjacent side member of the frame.

7. In an auxiliary supporting and positioning contrivance for automobile engines, the combination of a pair of anchorage elements disposed on opposite sides of each of the engine crank case arms and engaged over the top of the adjacent frame member, suspension elements extending beneath the engine crank case and having their ends adjustably connected to the anchorage elements of the opposed pairs, and a device fitted to each of the supporting arms of the engine crank case, one end of the device engaging beneath the adjacent frame member while the opposite end thereof interengages with a part of the case, said device having parts embracing the aforesaid suspension elements to maintain them against displacement.

8. In an auxiliary supporting and positioning contrivance for automobile engines having channeled supporting arms, the combination of anchorage elements engaged over the tops of the opposed side members of the automobile frame on opposite sides of the respective supporting arms of the engine case, suspension elements passing beneath the engine case and having their ends adjustably connected to the anchorage elements, and a device fitting within each of the channeled supporting arms of the engine case and so disposed with respect to the anchorage elements as to clamp the side flanges of the arm between itself and said anchorage elements, the device having parts embracing the suspension elements to maintain them against displacement.

9. In an auxiliary supporting and positioning contrivance for automobile engines having opposed channeled supporting arms, the combination of a pair of suspension means passing beneath the engine case and attached to the side members of the automobile frame on opposite sides of the supporting arms of the engine, and a device fitted within the channel of each of said arms and having parts engaged with the suspension means thereby to clamp the side flanges of the arm between itself and the suspension means.

10. In an auxiliary supporting and positioning contrivance for automobile engines having opposed channeled supporting arms, the combination of a pair of suspension means passing beneath the engine case and attached to the side members of the automobile frame on opposite sides of the supporting arms of the engine, and a device fitted within the channel of each of said arms and having parts engaged with the suspension means thereby to clamp the side flanges of the arm between itself and the suspension means, the parts being designed to fit between the side members of the frame and engine in such manner as to prevent lateral movement of the engine with respect to the frame.

11. In an auxiliary supporting and positioning contrivance for automobile engines having opposed channeled supporting arms, the combination of anchorage elements in the form of hooks engaged over the top of and depending along the inner side of each of the side members of the automobile frame on each side of the channeled supporting arm, a pair of suspension rods extending beneath the engine and having their ends adjustably connected to the opposed pairs of anchorage elements, and devices having branches fitting within the channels of the aforesaid arms adjacent the side flanges thereof, said devices being provided adjacent their lower ends with lateral extensions overhanging the side flanges of the arms and engaged about the suspension rods, each device having a boss fitting within an aperture of the crank case arm while the upper ends of its branches engage beneath the top flange of the adjacent side member of the frame, the parts being of such a size as to fit snugly between the engine and the opposed side members of the automobile frame so as to prevent lateral movement of the engine with respect to the frame.

12. A reinforcing device for crank case arms of the character described, said device consisting of a member fitting within the arm and designed to engage at its upper end beneath the top flange of an automobile frame member, the device having adjacent its lower end a part for engagement within an abutment portion of the engine.

In testimony whereof, I hereunto affix my signature.

JOSEPH C. THEBERATH.